(12) United States Patent
Chin et al.

(10) Patent No.: US 11,181,849 B2
(45) Date of Patent: Nov. 23, 2021

(54) LIQUID ELECTROSTATIC INK DEVELOPER ASSEMBLY

(71) Applicant: HP Indigo B.V., Amstelveen (NL)

(72) Inventors: Anna Chin, San Diego, CA (US);
Daniel Tanchangco, San Marcos, CA (US); Bin Huang, San Diego, CA (US); Guang Jin Li, San Diego, CA (US); Kai-Kong Iu, San Diego, CA (US)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/495,349

(22) PCT Filed: Jun. 28, 2017

(86) PCT No.: PCT/US2017/039733
§ 371 (c)(1),
(2) Date: Sep. 18, 2019

(87) PCT Pub. No.: WO2019/005037
PCT Pub. Date: Jan. 3, 2019

(65) Prior Publication Data
US 2020/0019088 A1 Jan. 16, 2020

(51) Int. Cl.
*G03G 15/08* (2006.01)
*C08G 18/40* (2006.01)
(Continued)

(52) U.S. Cl.
CPC ..... *G03G 15/0818* (2013.01); *C08G 18/4009* (2013.01); *C08G 18/4277* (2013.01);
(Continued)

(58) Field of Classification Search
CPC .......... G03G 9/13; G03G 9/131; G03G 9/132; G03G 9/08791
See application file for complete search history.

(56) References Cited

U.S. PATENT DOCUMENTS 3,850,829 A * 11/1974 Smith .................... G03G 9/132
430/113
6,117,557 A 9/2000 Massie, II et al.
(Continued)

FOREIGN PATENT DOCUMENTS

CN 102197343 A 9/2011
CN 106415402 A 2/2017
(Continued)

OTHER PUBLICATIONS

Conductive Rollers/belts for Printers and Paper Transport, Mar. 16, 2009, MPC http://www.mearthane.com/wp-content/uploads/2015/03/wp_conductiveRollers.pdf.
(Continued)

*Primary Examiner* — Walter L Lindsay, Jr.
*Assistant Examiner* — Jessica L Eley
(74) *Attorney, Agent, or Firm* — Dierker & Kavanaugh PC

(57) ABSTRACT

Described herein is a liquid electrostatic ink developer assembly comprising a developer roller having a surface coating, the surface coating comprising a polyurethane resin formed from a polyol; a hydroxyl-terminated polysiloxane; and a polyisocyanate. Also, described herein is a liquid electrostatic printing apparatus comprising the liquid electrostatic ink developer assembly.

21 Claims, 1 Drawing Sheet

(51) Int. Cl.
    *C08G 18/42*     (2006.01)
    *C08G 18/61*     (2006.01)
    *C08G 18/76*     (2006.01)
    *C08G 77/16*     (2006.01)
    *C08G 77/458*    (2006.01)
    *C08L 83/04*     (2006.01)
    *G03G 15/10*     (2006.01)

(52) U.S. Cl.
    CPC ......... *C08G 18/61* (2013.01); *C08G 18/7664* (2013.01); *C08G 77/16* (2013.01); *C08G 77/458* (2013.01); *C08L 83/04* (2013.01); *G03G 15/10* (2013.01)

(56) References Cited

U.S. PATENT DOCUMENTS

| | | | |
|---|---|---|---|
| 6,270,449 B1 | 8/2001 | Hirayama | |
| 7,007,384 B2 | 3/2006 | Hirayama | |
| 7,260,349 B2 | 8/2007 | Nakade et al. | |
| 7,356,287 B2* | 4/2008 | Guzman | G03G 15/104 399/237 |
| 7,831,183 B2 | 11/2010 | Oshiba et al. | |
| 7,983,605 B2 | 7/2011 | Nakamura et al. | |
| 8,500,616 B2 | 8/2013 | Barnes et al. | |
| 8,550,968 B2 | 10/2013 | Sugimura et al. | |
| 9,026,015 B2 | 5/2015 | Juri et al. | |
| 2004/0024166 A1 | 2/2004 | Hattori et al. | |
| 2006/0153597 A1 | 7/2006 | Guzman et al. | |
| 2006/0178443 A1 | 8/2006 | Boinowitz et al. | |
| 2008/0033142 A1* | 2/2008 | Ogata | B41M 5/506 528/271 |
| 2008/0069600 A1* | 3/2008 | Nakamura | G03G 15/0818 399/286 |
| 2008/0220361 A1* | 9/2008 | Uchino | G03G 15/0818 430/109.5 |
| 2010/0150609 A1* | 6/2010 | Nozaki | G03G 15/0818 399/159 |
| 2011/0045400 A1* | 2/2011 | Mitsuzawa | G03G 9/08791 430/112 |
| 2011/0177926 A1 | 7/2011 | Kusano et al. | |
| 2013/0028634 A1 | 1/2013 | Koyanagi et al. | |
| 2014/0087304 A1* | 3/2014 | Uno | G03G 9/13 430/114 |
| 2015/0086920 A1* | 3/2015 | Yoshie | G03G 9/09392 430/115 |
| 2015/0160547 A1* | 6/2015 | Yamada | G03G 9/131 430/114 |
| 2015/0277257 A1* | 10/2015 | Uno | G03G 9/0804 430/114 |
| 2015/0301465 A1 | 10/2015 | Masoud et al. | |

FOREIGN PATENT DOCUMENTS

| | | |
|---|---|---|
| EP | 1013705 | 5/2003 |
| JP | H06301278 A | 10/1994 |
| WO | WO-2012090418 | 7/2012 |
| WO | WO-2016175760 | 11/2016 |

OTHER PUBLICATIONS

International Search Report and Written Opinion for International Application No. PCT/US2017/039733 dated Mar. 29, 2018, 7 pages.

* cited by examiner

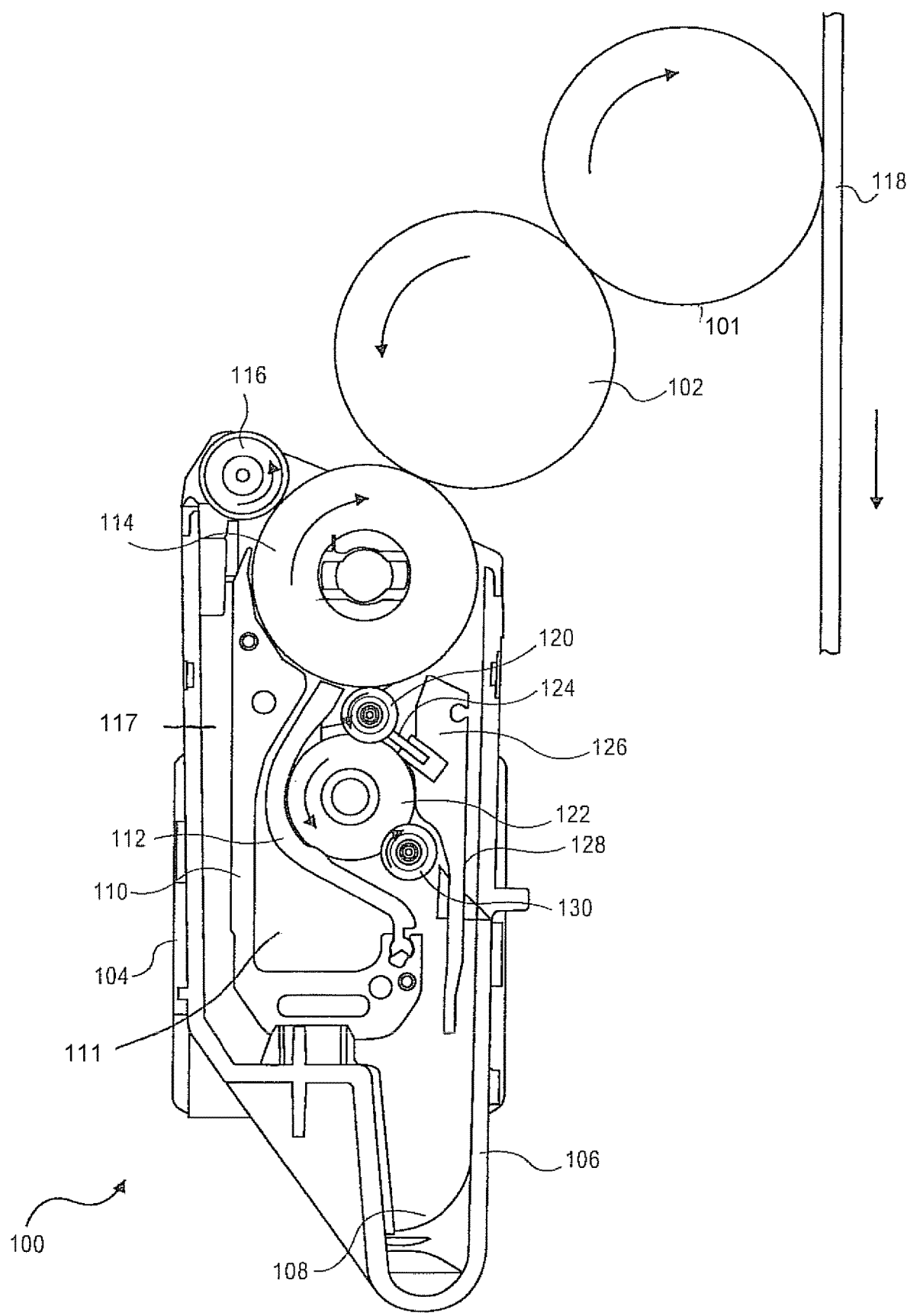

LIQUID ELECTROSTATIC INK DEVELOPER ASSEMBLY

In general, liquid electrostatic printing processes involve creating an image on a photoconductive surface, applying an ink comprising charged particles to the photoconductive surface, such that they selectively bind to the image, and then transferring the charged particles in the form of the image to a print medium.

The photoconductive surface is typically on a cylinder and is often termed a photo imaging plate (PIP). The photoconductive surface is selectively charged with a latent electrostatic image having image and background areas with different potentials. For example, a liquid electrostatic ink composition comprising charged particles suspended in a liquid carrier can be brought into contact with the selectively charged photoconductive surface. The charged toner particles adhere to the image areas of the latent image while the background areas remain clean. The image is then transferred to a print medium (e.g., paper) directly or, more commonly, by being first transferred to an intermediate transfer member, which can be a soft swelling blanket, and then to the print medium. Variations of this method utilize different ways for forming the electrostatic latent image on a photoreceptor or on a dielectric medium.

BRIEF DESCRIPTION OF THE FIGURES

FIG. 1 shows a schematic illustration of an example of a liquid electrostatic printing apparatus comprising a liquid electrostatic ink developer assembly as described herein.

DETAILED DESCRIPTION

Before the present disclosure is disclosed and described, it is to be understood that this disclosure is not restricted to the particular process features and materials disclosed herein because such process features and materials may vary somewhat. It is also to be understood that the terminology used herein is used for the purpose of describing particular examples.

It is noted that, as used in this specification and the appended claims, the singular forms "a", "an", and "the" include plural referents unless the context clearly dictates otherwise. As used herein, "carrier fluid", "carrier liquid", or "carrier vehicle" refers to the fluid in which pigment particles, colorant, charge directors and other additives can be dispersed to form a liquid electrostatic ink composition or liquid electrophotographic ink composition. The carrier liquids may include a mixture of a variety of different agents, such as surfactants, co-solvents, viscosity modifiers, and/or other possible ingredients.

As used herein, "liquid electrostatic ink composition" or "liquid electrophotographic ink composition" generally refers to an ink composition that is generally suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organometallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

As used herein, "hydroxyl-terminated" generally refers to the molecule so described as terminating at each end with a hydroxyl group.

If a standard test is mentioned herein, unless otherwise stated, the version of the test to be referred to is the most recent at the time of filing this patent application.

As used herein, "liquid electrostatic printing" or "liquid electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "liquid electrophotographic printers" or "liquid electrostatic printers" generally refer to those printers capable of performing liquid electrophotographic printing or liquid electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, for example, an electric field having a field gradient of 50-400 V/µm, or more, in some examples 600-900V/µm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl", or similar expressions such as "alk" in alkoxy, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to about 30 carbon atoms or more, and may be selected from, phenyl and naphthyl.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable as would be understood in the art.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also to include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided a liquid electrostatic ink developer assembly comprising:
a developer roller having a surface coating, the surface coating comprising a polyurethane resin formed from a polyol; a hydroxyl-terminated polysiloxane; and a polyisocyanate.

In another aspect, there is provided a liquid electrostatic printing apparatus comprising:
a liquid electrostatic ink developer assembly comprising a developer roller having a surface coating, the surface coating comprising a polyurethane resin formed from a polyol; a hydroxyl-terminated polysiloxane; and a polyisocyanate.

In another aspect, there is provided a method of liquid electrostatic printing, the method comprising:
providing a liquid electrostatic ink composition comprising chargeable particles;
passing the ink composition between a first electrode and a developer roller, the developer roller having a surface coating comprising a polyurethane resin formed from a polyol; a hydroxyl-terminated polysiloxane; and a polyisocyanate;
transferring at least some of the particles from the developer roller to a photoimaging plate to form an image on the photoimaging plate; and
transferring the image from the photoimaging plate to a print medium.

The present inventors have found that a developer roller having a surface coating, the surface coating comprising a polyurethane resin formed from a polyol; a hydroxyl-terminated polysiloxane; and a polyisocyanate provides increases the life-span of both the developer roller and the photo imaging plate (PIP) in a liquid electrostatic printer. The coating increases the scratch resistance of the developer roller over time and significantly slows the development of Old Photoconductor Syndrome (OPS).

Developer Roller

A liquid electrostatic ink developer assembly comprises a developer roller having a surface coating, the surface coating comprising a polyurethane resin formed from a polyol; a hydroxyl-terminated polysiloxane; and a polyisocyanate.

Surface Coating

Polyol

In some examples, the polyol comprises a molecule containing multiple hydroxyl functional groups. In some examples, the polyol comprises a polymeric molecule containing multiple hydroxyl functional groups. In some examples, the polyol comprises at least 2 hydroxyl functional groups. In some examples, the polyol comprise 2 hydroxyl functional groups.

In some examples, the polyol comprises a hydroxyl-terminated polymer. In some examples, the polyol comprises a hydroxyl-substituted polymer, that is, a polymer with hydroxyl substituents.

In some examples, the polyol comprises a polyester polyol, a polyether polyol, a polyamide polyol, a polyalkyl polyol, a polyaryl polyol, a polyalkenyl polyol, a polycycloalkyl polyol, or a polycycloalkenyl polyol. In some examples, the polyol comprises a polyester polyol.

In some examples, the polyol comprises a hydroxyl-terminated polyester polyol or a hydroxyl-substituted polyester polyol. In some examples, the polyol comprises a hydroxyl-terminated polyester polyol.

In some examples, the hydroxyl-terminated polyester polyol is formed from the polymerisation of a lactone. In some examples, the hydroxyl-terminated polyester polyol is formed from the polymerisation of a lactone with a diol.

In some examples, the lactone may be acetolactone, a propiolactone, a butyrolactone, a valerolactone, caprolactone, a heptanolide, an octanolide, a nonanolide, a decanolide. In some examples, the lactone may be a 3-membered ring lactone (such as acetolactone, α-propiolactone, α-butyrolactone, α-caprolactone), a 4-membered ring lactone (such as β-propiolactone, β-butyrolactone, β-valerolactone, β-caprolactone), a 5-membered ring lactone (such as γ-butyrolactone, γ-valerolactone, γ-caprolactone, 4-heptanolide, 4-octanolide, 4-nonanolide, 4-decanolide), a 6-membered ring lactone (such as δ-valerolactone, δ-caprolactone, 5-heptanolide, 5-octanolide, 5-nonanolide, 5-decanolide), a 7-membered ring lactone (such as ε-caprolactone, 6-heptanolide, 6-octanolide, 6-nonanolide, 6-decanolide). In some examples, the lactone may be acetolactone, β-propiolactone, γ-butyrolactone, δ-valerolactone, or ε-caprolactone. In some examples the lactone may be a caprolactone, in some examples, ε-caprolactone.

In some examples, the hydroxyl-terminated polyester polyol is a polyester diol. In some examples, the polyester diol is formed from the polymerisation of a lactone initiated by a diol. In some examples, the diol initiator is an alkyl diol, a cycloalkyl diol, an alkenyl diol, a cycloalkenyl diol, an aryl diol. In some examples, alkyl diol initiator may be selected from ethylene glycol, propanediol (e.g., 1,2-propanediol or 1,3-propanediol), butanediol (e.g., 1,2-butanediol, 1,3-butanediol or 1,4-butanediol), pentanediol (e.g., 1,5-pentanediol), hexanediol (e.g., 1,4-hexanediol or 1,6-hexanediol), neopentyl glycol (i.e., 2,2-dimethylpropane-1,3-diol), 2-methylpropane-1,3-diol, 2-methyl-2-ethylpropane-1,3-diol, 2,2-diethylpropane-1,3-diol, 2-methylbutane-1,4-diol, 2-methylbutane-1,3-diol, 2,2-dimethylbutane-1,3-diol, 2,2-dimethylbutane-1,4-diol, diethylene glycol, triethylene glycol, tetraethylene glycol, dipropylene glycol, tripropylene glycol, tetrapropylene glycol, dibutylene glycol, tributylene glycol, tetrabutylene glycol, polyethylene glycol, polypropylene glycol, methanediol, 1,4-cyclohexane dimethanol, 1,4-cyclohexanediol, bisphenol A, bisphenol F, hydrogenated bisphenol A and hydrogenated bisphenol F. In some examples, the alkyl diol may be selected from ethylene glycol, propanediol (e.g., 1,2-propanediol or 1,3-propanediol), butanediol (e.g., 1,2-butanediol, 1,3-butanediol or 1,4-butanediol), pentanediol (e.g., 1,5-pentanediol), hexanediol (e.g., 1,4-hexanediol or 1,6-hexanediol), neopentyl glycol (i.e., 2,2-dimethylpropane-1,3-diol), 2-methylpropane-1,3-diol, 2-methyl-2-ethylpropane-1,3-diol, 2,2-diethylpropane-1,3-diol, 2-methylbutane-1,4-diol, 2-methylbutane-1,3-diol, 2,2-dimethylbutane-1,3-diol, 2,2-dimethylbutane-1,4-diol, diethylene glycol, triethylene glycol, tetraethylene glycol, dipropylene glycol, tripropylene glycol, tetrapropylene glycol, dibutylene glycol, tributylene glycol, tetrabutylene glycol, polyethylene glycol, polypropylene glycol, methanediol, 1,4-cyclohexane dimethanol, 1,4-cyclohexanediol,. In some examples, the alkyl diol may be diethylene glycol or neopentyl glycol. In some examples, the alkyl diol is neopentyl glycol.

Hydroxyl-Terminated Polysiloxane

In some examples, by hydroxyl-terminated polysiloxane is meant a polysiloxane terminated at both ends with hydroxyl groups.

In some examples, the hydroxyl-terminated polysiloxane may have the following formula:

$$HO-R^2-R^1Si(R)_2O[Si(R)_2O]_nSi(R)_2R^1-R^2-OH$$

in which
    each R group may be independently selected from hydrogen, alkyl, cycloalkyl, alkenyl, cycloalkenyl, or aryl;
    each $R^1$ group may be independently selected from a single bond, alkyl, cycloalkyl, alkenyl, cycloalkenyl, aryl;
    each $R^2$ group may be independently selected from a single bond, alkyl, ether, polyether, ester, polyester, alkenyl, alkenylether, poly(alkenylether), alkenylester, poly(alkenylester); and
    n is 1 to 120, in some examples, 10 to 110, in some examples, 20 to 100, in some examples, 30 to 90, in some examples, 40 to 80, in some examples, 45 to 75, in some examples, 50 to 70.

In some examples, each R group may be independently selected from hydrogen and alkyl. In some examples, each R group may be independently selected from hydrogen, methyl, ethyl, propyl, isopropyl, butyl, isobutyl, tert-butyl, pentyl, hexyl, heptyl and octyl. In some examples, each R group may be independently selected from hydrogen, methyl and ethyl. In some examples, each R group may be methyl, that is, the hydroxyl-terminated polysiloxane may be a hydroxyl-terminated polydimethylsiloxane.

In some examples, each $R^1$ group may be independently selected from alkyl, cycloalkyl, alkenyl, and cycloalkenyl. In some examples, each $R^1$ group may be independently selected from alkyl and cycloalkyl. In some examples, each $R^1$ group may be independently selected from linear alkyl, branched alkyl or cycloalkyl. In some examples, each $R^1$ group may be the same or different. In some examples, each $R^1$ group may be the same. In some examples, each $R^1$ group may be independently a C1 to C20 alkyl group, in some examples, a C1 to C10 alkyl group, in some examples, a C1 to C5 alkyl group.

In some examples, each $R^2$ group may be independently selected from alkyl, ether, polyether, alkenyl, alkenylether or poly(alkenylether). In some examples, each $R^2$ group may be independently selected from ether or polyether. In some examples, each $R^2$ group may be independently selected from —(CH$_2$O)$_m$—, —(CH$_2$CH$_2$)$_m$—, —(CH$_2$CH$_2$CH$_2$O)$_m$—, —[CH$_2$(CH$_3$)CHO]$_m$—, —(CH$_2$CH$_2$CH$_2$CH$_2$)$_m$—, —[CH(CH$_3$)CH$_2$CH$_2$O]$_m$—, [CH$_2$CH(CH$_3$)CH$_2$O]—, and —[CH$_2$CH$_2$CH(CH$_3$)O]$_m$—, in which m may be any whole number, in some examples, any whole number from 1 to 10. In some examples, each $R^2$ group may be the same or different. In some examples, each $R^2$ group may be independently selected from —(CH$_2$O)$_m$—, —(CH$_2$CH$_2$)$_m$—, and —(CH$_2$CH$_2$CH$_2$O)$_m$—, in which m may be any whole number, in some examples, any whole number from 1 to 10. In some examples, each $R^2$ group may be —CH$_2$CH$_2$O—, —(CH$_2$CH$_2$)$_m$—, in which m may be any whole number, in some examples, any whole number from 1 to 10. In some examples, m is 1, 2, 3, 4, 5, 6, 7, 8, 9 or 10. In some examples, $R^2$ may be —CH$_2$CH$_2$O—.

In some examples, the hydroxyl-terminated polysiloxane may have the following formula:

$$HO(CH_2CH_2O)_m(CH_2)_pSi(CH_3)_2O[Si(CH_3)_2O]_nSi(CH_3)_2(CH_2)_p(OCH_2CH_2)_mOH$$

in which
    m is 0 to 10, in some examples, 1 to 5, in some examples, 1 to 3, in some examples, 1; n is 1 to 120, in some examples, 10 to 110, in some examples, 20 to 100, in some examples, 30 to 90, in some examples, 40 to 80, in some examples, 45 to 75, in some examples, 50 to 70;
    p is 0 to 10, in some examples, 1 to 5, in some examples, 2 to 4, in some examples, 3.

Polyisocyanate

In some examples, the polyisocyanate may be a diisocyanate, a triisocyanate, a tetraisocyanate or a polymeric isocyanate. In some examples, the polyisocyanate may be a diisocyanate or a polymeric isocyanate. In some examples, the polyisocyanate may be a polymeric isocyanate.

In some examples, the polyisocyanate may be a diisocyanate selected from (i) aromatic diisocyanates, such as methylene[bis(phenyl isocyanate)] (MDI) (e.g., 4,4'-methylene [bis(phenyl isocyanate)], 2,4'-methylene[bis(phenyl isocyanate)], or 2,2'-methylene[bis(phenyl isocyanate)]), xylylene diisocyanate (XDI) (e.g., m-xylylene diiso-cyanate), tetramethyl xylylene diisocyanate (e.g., 1,3-bis(1-isocyanato-1-methylethyl)-benzene), phenylene diisocyanate (e.g., 1,3-phenylene diisocyanate, or 1,4-phenylene diisocyanate), naphthalene diisocyanate (e.g., 1,5-naphthalene diisocyanate), dimethyl biphenyl diisocyanate (TODI) (e.g., 3,3'-dimethyl-4,4'-biphenylene diisocyanate), and toluene diisocyanate (TDI) (e.g., 2,4-toluene diisocyanate or 2,6-toluene diisocyanate; (ii) aliphatic diisocyanates, such as isophorone diisocyanate (IPDI), cyclohexyl diiso-cyanate (CHDI) (e.g., 1,4-cyclohexyl diisocyanate), decane diisocyanate (e.g., decane -1,10-diisocyanate), dodecane diisocyanate (e.g., dodecane-1,12-diisocyanate) hexa-methylene diisocyanate (HDI), cyclohexyl diisocyanate (e.g., 1,4-cyclohexyl diiso-cyanate), bis(isocyanatomethyl)cyclohexane (CHMDI) (e.g., 1,3-bis(isocyanatomethyl)-cyclohexane, or 1,4-bis(isocyanatomethyl)cyclohexane)), dicyclohexyl-methane diiso-cyanate (HMDI) (e.g., dicyclohexylmethane-4,4'-diisocyanate), hydrogenated diphenylmethane diisocyanate, and hydrogenated tolylene diisocyanate.

In some examples, the polyisocyanate may be a polymeric isocyanate. In some examples, the polymeric isocyanate may be polymeric diphenylmethane isocyanate (pMDI) or polymeric hydrogenated diphenylmethane isocyanate. In some examples, the polymeric isocyanate may be polymeric diphenylmethane diisocyanate (pMDI).

Structure

The developer roller comprises a surface coating, the surface coating comprising a polyurethane resin formed from a polyol; a hydroxyl-terminated polysiloxane; and a polyisocyanate.

In some examples, the developer roller comprises a surface coating disposed on an inner layer. In some examples, prior to application of the surface coating or a surface coating precursor solution, the inner layer comprises unreacted hydroxyl groups on the surface of the inner layer.

In some examples, the surface coating is applied to the inner layer as a surface coating precursor solution comprising a mixture of a polyol; a hydroxyl-terminated polysiloxane; and a polyisocyanate and then cured, forming the polyurethane resin. In some examples, the surface coating is applied to the inner layer as a surface coating precursor solution comprising a polyol; a hydroxyl-terminated polysiloxane; and a polyisocyanate in a solvent. In some examples, the solvent is selected from ethyl acetate, xylene, ketones, toluene, methyl isobutyl ketone, ethyl benzene, esters, butyl acetate and methoxy propyl acetate.

In some examples, the curing of the surface coating precursor solution causes the surface coating to bond to (previously unreacted) hydroxyl groups on the surface of the inner layer.

In some examples, the surface coating precursor solution is applied to the inner layer by spray coating, gravure coating, reverse roll coating, gap coating, slot die coating, immersion coating, curtain coating, air knife coating or combinations thereof.

In some examples, the surface coating has a resistivity of $1\times10^7$ MOhm·cm or less, in some examples, $5\times10^6$ MOhm·cm or less, in some examples, $1\times10^6$ MOhm·cm or less, in some examples, $5\times10^5$ MOhm·cm or less, in some examples, $1\times10^5$ MOhm·cm or less, in some examples, $5\times10^4$ MOhm·cm or less, in some examples, $1\times10^4$ MOhm·cm or less, in some examples, 5000 MOhm·cm or less, in some examples, 1000 MOhm·cm or less, in some examples, 500 MOhm·cm or less, in some examples, 100 MOhm·cm or less, in some examples, 50 MOhm·cm or less, in some examples, 10 MOhm·cm or less, in some examples, about 500 kOhm·cm. In some examples, the surface coating has a resistivity of 500 kOhm·cm or more, in some examples, 10 MOhm·cm or more, in some examples, 50 MOhm·cm or more, in some examples, 100 MOhm·cm, in some examples, 500 MOhm·cm or more, in some examples, 1000 MOhm·cm or more, in some examples, 5000 MOhm·cm or more, in some examples, $1\times10^4$ MOhm·cm or more, in some examples, $5\times10^4$ MOhm·cm or more, in some examples, $1\times10^5$ MOhm·cm or more, in some examples, $5\times10^5$ MOhm·cm or more, in some examples, $1\times10^6$ MOhm·cm or more, in some examples, $5\times10^6$ MOhm·cm or more, in some examples, about $1\times10^7$ MOhm·cm. In some examples, the surface coating has a resistivity of 500 kOhm·cm to $1\times10^7$ MOhm·cm, in some examples, 10 MOhm·cm to $5\times10^6$ MOhm·cm, in some examples, 50 MOhm·cm to $1\times10^6$ MOhm·cm. in some examples, 100 MOhm·cm to $5\times10^5$ MOhm·cm, in some examples, 500 MOhm·cm to $1\times10^5$ MOhm·cm, in some examples, 1000 MOhm·cm to $5\times10^4$ MOhm·cm, in some examples, 5000 MOhm·cm to $1\times10^4$. The resistivity is measured according to standard techniques, for example, as described in ASTM D257.

In some examples, the surface coating has a Shore A hardness of 10 or more, in some examples, 15 or more, in some examples, 20 or more, in some examples, 25 or more, in some examples, 30 or more, in some examples, 35 or more, in some examples, 40 or more, in some examples, 45 or more, in some examples, 50 or more, in some examples, 55 or more, in some examples, 60 or more, in some examples, about 65 or more, in some examples, 70 or more, in some examples, 75 or more, in some examples, about 80. In some examples, the surface coating has a Shore A hardness of 80 or less, in some examples, 75 or less, in some examples, 70 or less, in some examples, 65 or less, in some examples, 60 or less, in some examples, 55 or less, in some examples, 50 or less, in some examples, 45 or less, in some examples, 40 or less, in some examples, 35 or less, in some examples, 30 or less, in some examples, 25 or less, in some examples, 20 or less, in some examples, 15 or less, in some examples, about 10. In some examples, the surface coating has a Shore A hardness of 10 to 80, in some examples, 15 to 75, in some examples, 20 to 70, in some examples, 25 to 65, in some examples, 30 to 60. The Shore A hardness is measured according to standard techniques, for example, as described in ASTM D2240 using the type A scale.

In some examples, the inner layer may comprise a resilient material, for example, an elastomeric material. In some examples, the resilient material may be selected from natural rubber, synthetic rubber, chloroprene rubber, isoprene rubber, EPDM rubber, polyurethane rubber, epoxy rubber, butyl rubber, fluoroelastomers (such as the commercially available Viton, polyurethane, and epichlorohydrin(1-chloro-2,3-epoxypropane). In some examples, the inner layer may comprise a resistivity control agent, which may enable the inner layer to retain an electrical charge. In some examples, the resistivity control agent may be dispersed in the resilient material. The resistivity control agent may act to increase or decrease the resistivity of the elastomeric material (compared to the same material absent said resistivity control agent. In some examples, the resistivity control agent in the inner layer may be selected from an ionic material, a metal, or carbon (for example, carbon black). The ionic material may be a quaternary ammonium compound. The resistivity control agent, which may be dispersed in the elastomeric material, may be selected from organic dyes, organic pigments, organic salts, polyelectrolytes, inorganic salts, plasticisers, inorganic pigments, metallic particles, charge transfer complexes or materials which produce charge transfer complexes with the elastomeric material, e.g., polyurethane. The resistivity control agent may be present in an amount of 0.1 to 6 wt. % of the inner layer of the developer roller, with, in some examples, the remaining weight percentage being the elastomeric material. The resistivity control agent may be or may comprise a quaternary ammonium compound, for example, a compound of the formula $(NR^{1'}R^{2'}R^{3'}R^{4'})X'$, in which $R^{1'}$, $R^{2'}$, $R^{3'}$, and $R^{4'}$ are each independently hydrocarbon groups, including, but not limited to, alkyl or aryl groups, and wherein the alkyl is substituted or unsubstituted, branched or straight chain, saturated or unsaturated, and $X'$ is an anion, such as a halide. Examples of quaternary ammonium compounds include, but are not limited to, tetraheptyl ammonium bromide, trimethyloctadecyl ammonium chloride, benzyltrimethyl ammonium chloride. In some examples, the resistivity control agent is a lithium salt.

In some examples, the inner layer comprises, prior to deposition of the surface coating or application of a mixture of the constituent parts of the surface coating composition, unreacted hydroxyl groups on the surface of the inner layer to which the surface coating can bond.

In some examples, the developer roller comprises a surface coating, an inner layer and a core, wherein the inner layer is disposed on the core and the surface coating is disposed on the inner layer.

In some examples, the core comprises a conductive material, for example, a metal. In some examples, the conductive core allows a charge to transfer from the core to the inner layer. In some examples, the core may comprise a metal selected from, but not limited to steel, aluminium and copper. In some examples, the core comprises an electroplated surface, which may comprise electroless nickel phosphorus.

In some examples, the inner layer is applied to the core by a casting method in which the core is placed into a mold and the inner layer, either in a liquid (e.g., melted) form or as a precursor solution, is poured into the mold such that the liquid inner layer or inner layer precursor material surrounds the core. The liquid inner layer or inner layer precursor material is then cured onto the surface of the core and removed from the mold.

Liquid Electrostatic Ink Developer Assembly

In some examples, the liquid electrostatic ink developer assembly comprises a developer roller as described herein.

In some examples, the liquid electrostatic ink developer assembly may include a housing within which the other components of the liquid electrostatic ink developer assembly are disposed. The housing may define a liquid electrostatic ink tray that stores liquid electrostatic ink that is ultimately used to form an image on a print medium. In some examples, the liquid electrostatic ink comprises chargeable particles comprising a thermoplastic resin dispersed in a carrier liquid.

In some examples, the liquid electrostatic ink developer assembly comprises a developer roller and an electrode. In some examples, the developer roller and the electrode are, in use, spaced apart to define a gap through which a liquid electrostatic ink can pass. In some examples, in use, the potential difference between the developer roller and the electrode causes the charged particles of the liquid electrostatic ink to migrate towards and adhere to the developer roller. In some examples, some of the liquid carrier remains with the particles on the developer roller.

In some examples, the liquid electrostatic ink developer assembly comprises a developer roller and a squeegee roller. In some examples, the squeegee roller is located adjacent to the developer roller. In some examples, the surfaces of the squeegee roller and the developer roller, in the absence of an ink composition, are in contact. In some examples, one or both of the squeegee roller and the developer roller has a compressible surface. In use, the squeegee roller may be adapted to rotate in an opposite direction to the developer roller. In some examples, in use, as the developer roller rotates, liquid electrostatic ink on the developer roller passes between the developer roller and the squeegee roller and the resin-containing particles of the liquid electrostatic ink composition are caused to move towards the developer roller, due to the potential difference between the developer roller and the squeegee roller, and some of the liquid carrier from the liquid electrostatic ink is removed, concentrating the ink on the developer roller.

In some examples, the squeegee roller may comprise a metal. In some examples, the squeegee roller may comprise a metal having a surface covering comprising an elastomeric material. For example, the squeegee roller may comprise a metal core, and the metal core may have an outer surface layer comprising an elastomeric material. The metal may be selected from, but is not limited to, steel, aluminium and copper. The surface covering or outer surface layer of the squeegee roller may comprise an elastomeric material and a resistivity control agent, which may be dispersed in the elastomeric material. The resistivity control agent may act to increase or decrease the resistivity of the elastomeric material (compared to the same material absent said resistivity agent). The elastomeric material may comprise a material selected from chloroprene rubber, isoprene rubber, EPDM rubber, polyurethane rubber, epoxy rubber, butyl rubber, fluoroelastomers (such as the commercially available Viton) and polyurethane. The resistivity control agent, which may be dispersed in the elastomeric material, may be selected from an ionic material, a metal or carbon. The ionic material may be a quaternary ammonium compound. The resistivity control agent, which may be dispersed in the elastomeric material, may be selected from organic dyes, organic pigments, organic salts, polyelectrolytes, inorganic salts, plasticisers, inorganic pigments, metallic particles, charge transfer complexes or materials which produce charge transfer complexes with the elastomeric material, e.g., polyurethane. The resistivity control agent may be present in an amount of 0.1 to 6 wt. % of the surface covering of the squeegee roller, with, in some examples, the remaining weight percentage being the elastomeric material. The resistivity control agent may be or may comprise a quaternary ammonium compound, for example, a compound of the formula $(NR^{1'}R^{2'}R^{3'}R^{4'})X'$, in which $R^{1'}$, $R^{2'}$, $R^{3'}$, and $R^{4'}$ are each independently hydrocarbon groups, including, but not limited to, alkyl or aryl groups, and whereint he alkyl is substituted or unsubstituted, branched or straight chain, saturated or unsaturated, and X' is an anion, such as a halide. Examples of quaternary ammonium compounds include, but are not limited to, tetraheptyl ammonium bromide, trimethyloctadecyl ammonium chloride, benzyltrimethyl ammonium chloride. In some examples, the resistivity control agent is a lithium salt.

In some examples, the liquid electrostatic ink developer assembly comprises a developer roller, an electrode and a squeegee roller.

In some examples, the liquid electrostatic ink developer assembly comprises a developer roller and a cleaner roller. In some examples, the cleaner roller cleans the unused ink from the developer roller. In some examples, the liquid electrostatic ink developer assembly comprises a developer roller, an electrode and a cleaner roller. In some examples, the liquid electrostatic ink developer assembly comprises a developer roller, a squeegee roller and a cleaner roller. In some examples, the liquid electrostatic ink developer assembly comprises a developer roller, an electrode, a squeegee roller and a cleaner roller. In some examples, in use, the cleaner roller removes any unused ink, that is, ink that has not been transferred from the developer roller to the photo-imaging plate, from the developer roller. In some examples, in use, the potential difference between the developer roller and the cleaner roller causes the charged particles of the liquid electrostatic ink to migrate towards and adhere to the cleaner roller.

In some examples, the liquid electrostatic ink developer assembly comprises a developer roller, a cleaner roller and a sponge roller. In some examples, the liquid electrostatic ink developer assembly comprises a developer roller, a squeegee roller, a cleaner roller and a sponge roller. In some examples, the liquid electrostatic ink developer assembly comprises a developer roller, an electrode, a cleaner roller and a sponge roller. In some examples, the liquid electrostatic ink developer assembly comprises a developer roller, an electrode, a squeegee roller, a cleaner roller and a sponge roller. In some examples, the sponge roller adsorbs the unused ink cleaned from the developer roller by the cleaner roller.

In some examples, the liquid electrostatic ink developer assembly comprises a developer roller, a cleaner roller, a sponge roller and a squeezer roller. In some examples, the liquid electrostatic ink developer assembly comprises a developer roller, a squeegee roller, a cleaner roller, a sponge roller and a squeezer roller. In some examples, the liquid electrostatic ink developer assembly comprises a developer roller, an electrode, a cleaner roller, a sponge roller and a squeezer roller. In some examples, the liquid electrostatic ink developer assembly comprises a developer roller, an electrode, a squeegee roller, a cleaner roller, a sponge roller and a squeezer roller. In some examples, the squeezer roller wrings out (i.e., releases) the unused ink that has been absorbed by the sponge roller for reuse.

In some examples, the liquid electrostatic ink developer assembly comprises a developer roller and a liquid electrostatic ink tray. In some examples, the liquid electrostatic ink developer assembly comprises a developer roller, an electrode and a liquid electrostatic ink tray. In some examples, the liquid electrostatic ink developer assembly comprises a developer roller, a squeegee roller and a liquid electrostatic ink tray. In some examples, the liquid electrostatic ink developer assembly comprises a developer roller, an electrode, a squeegee roller and a liquid electrostatic ink tray. In some examples, the liquid electrostatic ink developer assembly comprises a developer roller, an electrode, a squeegee roller, a cleaner roller and a liquid electrostatic ink tray. In some examples, the liquid electrostatic ink developer assembly comprises a developer roller, an electrode, a squeegee roller, a cleaner roller, a sponge roller and a liquid electrostatic ink tray.

Liquid Electrostatic Ink

In some examples, the liquid electrostatic ink comprises chargeable particles comprising a thermoplastic resin dispersed in a carrier liquid. In some examples, the chargeable particles are suspended in the carrier liquid. In some examples, the liquid electrostatic ink may further comprise a colorant. In some examples, the chargeable particles comprising a thermoplastic resin may further comprise a colorant. In some examples, the liquid electrostatic ink composition may further comprise a charge adjuvant and/or a charge director.

The thermoplastic resin may be selected rom ethylene acrylic acid copolymers; methacrylic acid copolymers; ethylene methacrylic acid copolymers; ethylene vinyl acetate copolymers; copolymers of ethylene (e.g. 80 wt % to 99.9 wt %) and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl may include from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the thermoplastic resin comprises a first polymer that is a copolymer of ethylene or propylene and an ethylenically unsaturated acid of either acrylic acid or methacrylic acid. In some examples, the first polymer is absent ester groups and the thermoplastic resin further comprises a second polymer having ester side groups that is a co-polymer of (i) a first monomer having ester side groups selected from esterified acrylic acid or esterified methacrylic acid, (ii) a second monomer having acidic side groups selected from acrylic or methacrylic acid and (iii) a third monomer selected from ethylene and propylene.

Prior to liquid electrostatic printing the resin may constitute 5% to 99% by weight of the solids in the liquid electrostatic ink composition, in some examples, 50% to 90% by weight of the solids of the liquid electrostatic ink composition, in some examples, 70% to 90% by weight of the solids of the liquid electrostatic ink composition. The remaining wt % of the solids in the liquid electrostatic ink composition may be the colorant and, in some examples, any other additives that may be present.

In some examples, the liquid electrostatic ink further comprises a carrier liquid and the chargeable particles comprising a thermoplastic resin may be suspended in the carrier liquid. Generally, the carrier liquid acts as a dispersing medium for the other components in the liquid electrostatic ink. For example, the carrier liquid can comprise or be a hydrocarbon, silicone oil, vegetable oil, etc. The carrier liquid can include, but is not limited to, an insulating, non-polar, non-aqueous liquid that is used as the medium for the chargeable particles. The carrier liquid can include compounds that have a resistivity in excess of about $10^9$ ohm·cm. The carrier liquid may have a dielectric constant below about 30, in some examples, below about 10, in some examples, below about 5, in some examples, below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquid include, but are not limited to, aliphatic hydrocarbons, isoparaffinic compounds, paraffinic compounds, dearomatized hydrocarbon compounds, and the like. In particular, the carrier liquid can include, but is not limited to, Isopar-G™, lsopar-H™, Isopar-L™, Isopar-M™, Isopar-K™, lsopar-V™, Norpar 12™, Norpar 13™, Norpar 15™, Exxol 040™, Exxol 080™, Exxol 0100™, Exxol 0130™, and Exxol 0140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF -5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The carrier liquid and other components of the present disclosure are described in U.S. Pat. No. 6,337,168, U.S. Pat. No. 6,070,042, and U.S. Pat. No. 5,192,638, all of which are incorporated herein by reference.

In some examples, prior to liquid electrostatic printing, the carrier liquid constitutes about 20 to 99.5% by weight of the liquid electrostatic ink, in some examples, 50 to 99.5% by weight of the liquid electrostatic ink. In some examples, prior to liquid electrostatic printing, the carrier liquid constitutes about 40 to 90% by weight of the liquid electrostatic ink. In some examples, prior to liquid electrostatic printing, the carrier liquid constitutes about 60 to 80% by weight of the liquid electrostatic ink. In some examples, prior to liquid electrostatic printing, the carrier liquid may constitute about 90 to 99.5% of the liquid electrostatic ink, in some examples, 95 to 99% of the liquid electrostatic ink.

In some examples, the liquid electrostatic ink may further comprise a colorant. In some examples, the chargeable particles comprising the resin may further comprise a colorant. The colorant may be a dye or pigment. The colorant may be any colorant compatible with the carrier liquid and useful for liquid electrostatic printing. For example, the colorant may be present as pigment particles, or may comprise a resin (in addition to the polymers described herein) and a pigment. The resins and pigments can be any of those commonly used as known in the art. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant 35 Yellow 10GX, Permanent Yellow G3R -01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUEL 710 10 IF, HELIOGEN® BLUEL 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul 15 Uhlich including UHLICH® BK 8200.

In some examples, the liquid electrostatic ink comprise a charge director. A charge director can be added to a liquid electrostatic ink composition to impart a charge of a desired polarity and/or maintain sufficient electrostatic charge on the particles of a liquid electrostatic ink. The charge director may comprise ionic compounds, including, for example, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, and the like. The charge director may be selected from oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g., see WO 2007/130069). The charge director may impart a negative charge or a positive charge on the resin-containing particles of an electrostatic ink composition.

The charge director can comprise a sulfosuccinate moiety of the general formula: $[R_a—O—C(O)CH_2CH(SO_3^-)C(O)—O—R_b]$, in which each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, in which each of $R_a$ and $R_b$ is an alkyl group, or other charge directors as found in WO 2007130069, which is incorporated herein by reference in its entirety. As described in WO 2007130069, the sulfosuccinate salt of the general formula $MA_n$ is an example of a micelle forming salt. The charge director may be substantially free of or free of an acid of the general formula HA, in which A is as described above. The charge director may comprise micelles of said sulfosuccinate salt enclosing at least some of the nanoparticles. The charge director may comprise at least some nanoparticles having a size of 200 nm or less, in some examples, 2 nm or more. As described in WO 2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{3+}$, or from any sub-group thereof. The simple salt may comprise an anion selected from $SO_4^{2-}$, $PO^{3-}$, $NO^{3-}$, $HPO_4^{2-}$, $CO_3^{2-}$, acetate, trifluoroacetate (TFA), $Cl^-$, Bf, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$, and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl group. In some examples, said aliphatic alkyl group is linear. In some examples, said aliphatic alkyl group is branched. In some examples, said aliphatic alkyl group includes a linear chain of 6 carbon atoms or more. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO 2007130069.

The charge director may comprise (i) soya lecithin, (ii) a barium sulfonate salt, such as basic barium petronate (BBP), and (iii) an isopropyl amine sulfonate salt. Basic barium petronate is a barium sulfonate salt of a 21-26 carbon atom hydrocarbon alkyl chain, and can be obtained, for example, from Chemtura. An example isopropyl amine sulfonate salt is dodecyl benzene sulfonic acid isopropyl amine, which is available from Croda.

In a liquid electrostatic ink, the charge director may constitute about 0.001% to 20% by weight, in some examples, 0.01 to 20% by weight, in some examples, 0.01 to 10% by weight, in some examples, 0.01 to 1% by weight of the solids of a liquid electrostatic ink. The charge director can constitute about 0.001 to 0.15% by weight of the solids of a liquid electrophotographic, in some examples, 0.001 to 0.15% by weight, in some examples, 0.001 to 0.02% by weight of the solids of a liquid electrophotographic ink. In some examples, a charge director imparts a negative charge on an electrostatic ink composition. The particle conductivity may range from 50 to 500 pmho/cm, in some examples, from 200-350 pmho/cm.

A liquid electrostatic may include a charge adjuvant. A charge adjuvant may be present with a charge director, and may be different to the charge director, and act to increase and/or stabilise the charge on the chargeable particles, for example, resin-containing particles, of a liquid electrostatic ink. The charge adjuvant may include barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethyl-hexyl methacrylate-co-methacrylic acid calcium, and ammonium salts, co-polymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In some examples, the charge adjuvant is aluminium di- and/or tristearate and/or aluminium di- and/or tripalmitate.

The charge adjuvant may constitute about 0.1 to 5% by weight of the solids of a liquid electrostatic ink. The charge adjuvant may constitute about 0.5 to 4% by weight of the solids of a liquid electrostatic ink. The charge adjuvant may constitute about 1 to 3% by weight of the solids of a liquid electrostatic ink.

In some examples, a liquid electrostatic ink may include an additive or a plurality of additives. The additive or plurality of additives may be added at any stage of the production of the liquid electrostatic ink composition. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon cooling of the resin fused mixture during and after the transfer of the ink film to the print medium, for example, from an intermediate transfer member, which may be a heated blanket.

Liquid Electrostatic Printing Apparatus

In some examples, a liquid electrostatic printing apparatus comprises a liquid electrostatic ink developer assembly comprising a developer roller having a surface coating, the surface coating comprising a polyurethane resin formed from a polyol; a hydroxyl-terminated polysiloxane; and a polyisocyanate.

In some examples, a liquid electrostatic printing apparatus comprises a liquid electrostatic ink developer assembly and a photoimaging plate. In some examples, the photoimaging plate is in the form of a photoconductive drum.

In some examples, a liquid electrostatic printing apparatus comprises a liquid electrostatic ink developer assembly, a photoimaging plate and an intermediate transfer member.

A non-limiting example of a liquid electrostatic printing apparatus and method of liquid electrostatic printing as described herein will now be described with reference to FIG. 1. FIG. 1 shows an example liquid electrostatic printing apparatus (100) comprising a liquid electrostatic ink developer assembly (104) comprising a developer roller (114) having a surface coating, the surface coating comprising a polyurethane resin formed from a polyol; a hydroxyl-terminated polysiloxane; and a polyisocyanate.

The liquid electrostatic printing apparatus shown in FIG. 1 includes an intermediate transfer member (101), a photoimaging plate in the form of a photoconductive drum (12), and a liquid electrostatic ink developer assembly (104). The liquid electrostatic ink developer assembly includes a housing (106) within which the other components of the liquid electrostatic ink developer assembly are disposed. The housing (106) defines an ink tray (108) that stores liquid electrostatic ink that is ultimately used to form an image on a print medium (118). In some examples, the liquid electrostatic ink comprises particles dispersed in a liquid carrier, the particles comprising a resin.

The liquid electrostatic ink developer assembly (104) includes a first electrode (110) and a second electrode (112). Both the first electrode and second electrode may have a negative electrical potential or a positive electrical potential. In some examples, both the first electrode and the second electrode may have a negative potential, such as −1500 volts or less, in some examples, −1800 volts or less. The first and second electrodes may define an inlet chamber (111).

The first electrode has a surface that corresponds substantially in shape to the curved surface of the developer roller (114). In use, the liquid electrostatic ink comprising particles comprising a resin is transferred to the inlet chamber (111), filing it until the surface of the liquid electrostatic ink reaches the top of the chamber (111), and contacts the rotating developer roller (114). In some examples, when a potential is applied between the first electrode (110) and the developer roller (114), the resin-containing particles may become sufficiently charged. In some examples, the charging of the resin particles is promoted if there is circulation of the ink around the liquid electrostatic ink developer assembly, including around the developer roller, before it is transferred to the photoimaging plate.

The developer roller (114) is at an electrical potential that is less negative than the electrode (110), for example, in the range of −200 to −600 volts, in some examples, −450 volts. The developer roller (114) rotates as indicated in FIG. 1. As the liquid electrostatic ink composition contacts the developer roller, the particles migrate in the electric field towards and adhere to the developer roller. Some of the liquid carrier remains with the particles on the developer roller.

The liquid electrostatic ink developer assembly (104) includes a squeegee roller (116), which rotates in the opposite direction as compared to the developer roller (114), and which is at an electrical potential that is more negative than the developer roller, such as a potential in the range of −600 to −1000 volts, for example, −750 volts. As the developer roller (114) rotates, the liquid electrostatic ink on the developer roller is brought into contact with the squeegee roller. The squeegee roller (116), in the absence of ink, presses against the developer roller (114), and either one or both of the squeegee roller (116) or developer roller (114) has a compressible surface. When the ink passes between the developer roller (114) and the squeegee roller (116), the resin-containing particles are again disposed to move towards the developer roller (114), due to the potential difference between the developer roller (114) and squeegee roller (116), and some of the liquid carrier associated with the particles is removed, concentrating the ink on the developer roller. The liquid carrier that is removed flows down into cavity 117, and then into the liquid electrostatic ink tray (108), which is fluidly connected with cavity 117.

The liquid electrostatic printing apparatus further provides a photoconductive drum (102), which, in use, is rotating in the opposite direction in relation to the developer roller (114), as indicated in FIG. 2. After the liquid electrostatic ink has been concentrated on the developer roller by the squeegee roller, it moves around the developer roller as it rotates until it reaches the photoconductive drum (102). The ink remaining on the developer roller (114) is selectively transferred to the photoconductive drum (102). The photoconductive drum (102) has previously been selectively charged in correspondence with the image desired to be formed on a print medium (118). The liquid electrostatic ink on the developer roller (114) is transferred to the photoconductive drum (102) only where the drum (102) has been selectively charged.

Thereafter, the photoconductive drum (102) makes contact with an intermediate transfer member (101), in this case, an intermediate transfer roller, which makes contact with the print medium (118) to transfer the ink onto the print medium (118). In this way, a desired image is formed on the print medium (118). The photoconductive drum (102) and the intermediate transfer member (101) rotate as indicated in FIG. 1.

The liquid electrostatic ink that is not transferred from the developer roller (114) to the photoconductive drum (102) is referred to as unused ink. The liquid electrostatic ink developer assembly includes a cleaner roller (120), which is rotating as indicated in FIG. 1 and is at an electrical potential that is less negative than the developer roller (114), such as −250 volts. The cleaner roller (120) cleans the unused liquid electrostatic ink from the developer roller (114).

The liquid electrostatic ink developer assembly (104) includes a sponge roller (122), which rotates in the same direction as the cleaner roller (120). The sponge roller (122) is a sponge in that it has a number of open cells, or pores. For instance, the sponge roller (122) may be made from open-cell polyurethane foam. The sponge roller (122) can be compressed, and is compressed by its path being interfered with by the second electrode (112), the cleaner roller (120), and a squeezer roller (130) of the liquid electrostatic ink developer assembly (104).

The sponge roller (122) absorbs the unused ink cleaned by the cleaner roller (120), and by a wiper blade (124), from the developer roller (114). That is, any unused ink remaining on the cleaner roller (120) that is not absorbed by the sponge roller (122) is scraped from the cleaner roller (120) into the sponge roller (122) by the wiper blade (124). The wiper blade (124) is part of a wiper mechanism (126) of the liquid electrostatic ink developer assembly (104), and the wiper mechanism (126) also includes a wiper (back) wall (128).

The squeezer roller (120) wrings out (i.e., releases) the unused ink that has been absorbed by the sponge roller (122) for reuse. Thus, the unused ink released from the sponge roller (122) by the squeezer roller (13) returns to the ink tray (108). The sponge roller (122) further serves to break up solid parts of the unused ink, allowing it to be mixed homogenously with the less concentrated ink in the ink tray (108). The squeezer roller (130) releases the unused ink from the sponge roller (122) by compressing the sponge roller (122). That is, the squeezer roller (130) squeezes the sponge roller (122) to release the unused in form the sponge roller (122).

After the sponge roller (122) has been compressed, it subsequently expands, since it is made from a resilient material.

As mentioned above, in an example, the liquid electrostatic ink composition is circulated within the liquid electrostatic ink developer assembly (104) before it is transferred to the photoimaging plate (102). In an example, the developer roller (114), if desired with the other components of the liquid electrostatic ink developer assembly (104), is moveable relative to the photoimaging plate (102), such that the surfaces of the developer roller (114) and the photoimaging plate (102) can be disengaged or separated.

In an example, as an initial step in the method of liquid electrostatic printing the surfaces of the photoimaging plate (102) and the developer roller (114) are disengaged, and the ink is caused to flow around the liquid electrostatic ink developer assembly (104), for example, circulating on the developer roller (114) past the squeegee roller (116), to the cleaner roller (120), where it is removed, each of the rollers having a potential applied to them as they would in a printing process as described above, and the ink then passed back to the liquid electrostatic ink tray (108), and then transferred back to the developer roller (114), via inlet chamber (111). After circulation in this disengaged state, the developer roller (114) and the photoimaging plate (102) can be engaged to allow particles to pass from the developer roller (114) to the photoimaging plate (102).

EXAMPLES

The following illustrates examples of the liquid electrostatic ink developer assembly, liquid electrostatic printing apparatus and method of liquid electrostatic printing, as well as related aspects described herein. Thus, these examples should not be considered to restrict the present disclosure, but are merely in place to teach how to carry out methods and use apparatus of the present disclosure.

Example 1

A precursor coating solution was prepared according to Table 1. CAPA 2101A is a hydroxyl-terminated polycaprolactone formed from the polymerisation of ε-caprolactone initiated by neopentyl glycol.

TABLE 1

| Name | Supplier | Function | Chem Structure | % weight |
|---|---|---|---|---|
| Mondur MR Light | Covestro | Isocyanate | MDI | 4.40 |
| CAPA 2101A | Perstorp | Polyol | Poly caprolactone polyol | 14.66 |
| DMS C21 | Gelest | Surfactant | PDMS | 1.00 |
| LV-33 | Dabco | Catalyst | C6H12N2 | 0.01 |
| Ethyl Acetate | Sigma-Aldrich | Solvent | C4H8O2 | 79.93 |

A roller comprising a core [comprising aluminium with a nickel phosphorus coating (approximately 20 µm thick)] and a polyurethane base rubber inner layer containing a resistivity control agent (a lithium salt) was selected. The polyurethane inner layer was a 4 mm thick layer formed by casting in a mould a composition according to Table 2 in accordance with the following process:

a. De-gas polyol for 24 hrs at 90° C. Increase temperature to 105° C. 2 hrs prior to casting.
b. De-gas isocyanate for at least 2 hrs prior to casting.
c. Pre-heat molds to 100° C. at least 3 hrs prior to casting.
d. Mix material together at 1500 rpm for 3 mins.
e. Pour material in mold and cure at 125° C. for 6 hours.

TABLE 2

| Name | Supplier | Function | Chem structure | % weight |
|---|---|---|---|---|
| Desmophen F207-60A | Covestro | Polyol | DEG-AA-TMP* | 88.80 |
| Mondur MR Light | Covestro | Isocyanate | MDI | 8.88 |
| HQ-115 | 3M | Conducting agent | LiN(SO2CF3)2 | 0.68 |
| Staboxal P200 | Rhein Chemie | Anti-hydrolysis | Poly-carbodiimide | 1.47 |
| LPX 5795 | Byk | Mold release | Silicone surfactant | 0.15 |
| LV-33 | Dabco | Catalyst | C6H12N2 | 0.02 |

The surface coating precursor solution was applied to the base rubber covered roller by spray coating using an HPLV spray gun. The surface coating was then cured by heating at 100° C. for 2 h to form the developer roller having a surface coating comprising a polyurethane resin. The surface coating was applied in sufficient quantities to form an approximately 6 µm thick layer over the inner layer of the roller.

The developer roller was then inserted into a liquid electrostatic ink developer assembly containing a squeegee roller comprising a steel core electroplated with an approximately 15 µm thick layer of medium-phosphorous electroless nickel.

The liquid electrostatic ink developer assembly was placed in a liquid electrostatic printing apparatus comprising a photoconductive drum having a photoimaging plate (100 µm thick; from Mitsubishi) thereon.

REFERENCE EXAMPLE

A reference liquid electrostatic ink developer assembly and reference liquid electrostatic printing apparatus were produced according to Example 1 but the surface coating precursor solution was a mixture of hydroxyl-terminated polydimethylsiloxane (DMS C21 from Gelest; 1 wt. %), polymeric diphenylmethane diisocyanate (pMDI; Modur MR Lite from Covestro; 5 wt. %), a lithium salt (HQ-115 [LiN(SO$_2$CF$_3$)$_2$] from 3M; 0.04 wt. %) and a catalyst (LV-33 from Dabco; 1,4-diazabicyclo[2.2.2]octane solution; 0.1 wt. %) in ethyl acetate (93.86 wt. %), which was applied in sufficient quantities to form an approximately 0.5 µm thick layer as the surface coating.

Magenta Dry Ink Tape Test

A developer roller according to Example 1 was cleaned with Isopar L using a clean cloth.

The developer roller was then inserted into a liquid electrostatic ink developer assembly, which was then placed in a liquid electrostatic printing apparatus (HP Indigo 3 series printing press). Colour calibration for magenta was performed.

Ink was continuously developed on the roller for 3 mins.

The liquid electrostatic developer assembly was then removed from the printing press and left for one minute for the developer roller surface to dry.

Tape (Scotch 600 tape from 3M) was applied to the developer roller surface in two locations around the circumference of the developer roller making sure that no bubbles were trapped under the tape. The tape was rapidly removed from the roller at an angle of 90° from the surface over <2 seconds and then placed on a white sheet of paper. The optical density of the magenta ink dried on the developer roller and therefore transferred to the tape adhered to the white sheet of paper was measured using an X-rite densitometer.

The same procedure was performed for a liquid electrostatic ink developer assembly produced according to the Reference Example.

The peeling test was performed at 0 k imps and at 100 k imps for both a developer roller according to Example 1 and according to the Reference Example. The results of the optical density measurements show an approximately two fold reduction in the optical density when a developer roller according to Example 1 is used, suggesting that half the amount of magenta ink adheres to the surface of the developer roller when printing is stopped and the ink dries.

Black Ghost Test

A developer roller produced according to Example 1 was wiped with Isopar L using a clean cloth. The developer roller was then inserted into a liquid electrostatic ink developer assembly which was then placed in a liquid electrostatic printing apparatus (HP Indigo 3 series printing press). Colour calibration for black ink was performed. Ghost plots were printed at default relative cleaner voltage (−325V).

The relative voltage between the cleaner roller and the developer roller (Vcl) was adjusted to −350 and two pages of ghost plots were printed, remembering to change print pattern to allow automatic plot identification. The relative Vcl was adjusted to −375 and two pages of ghost plots were printed, remembering to change the print pattern to allow automatic plot identification.

The developer roller was removed from the liquid electrostatic ink developer assembly and wiped thoroughly with Isopar L.

The same procedure was performed for a liquid electrostatic ink developer assembly produced according to the Reference Example.

The K Ghost was assessed by automatic plot scanning with a scanner. The tests showed that a developer roller according to Example 1 showed a 2× reduction in K Ghost in comparison to a developer roller according to the Reference Example.

Scratch Resistance

Developer rollers according to Example 1 and the Reference Example were rotated at a speed of 60 mm/s and scratched with a 1 mm conical tungsten carbide tip moving at 60 mm/s and a depth of 2 mm. The force at scratch is measured. The developer roller having the surface coating produced in the Reference Example showed significant damage after only a few rotations, with the entire surface coating removed and significant damage to the polyurethane inner layer shown after 100 rotations. The developer roller having the surface coating produced according to Example 1 showed some surface scratching after 100 rotations but the surface coating remained largely intact.

The invention claimed is:

1. A liquid electrostatic ink developer assembly comprising:
a developer roller including:
an inner layer including a resilient material is selected from the group consisting of natural rubber, synthetic rubber, polyurethane, and epichlorohydrin(1-chloro-2,3-epoxypropane); and
a cured surface coating disposed on the inner layer, the cured surface coating comprising a cured polyurethane resin formed from a polyol; a hydroxyl-terminated polysiloxane with hydroxyl groups at both ends; and a polyisocyanate, and forming an outermost layer of the developer roller.

2. The liquid electrostatic ink developer assembly according to claim 1, wherein the polyol comprises a hydroxyl-terminated polyester polyol.

3. The liquid electrostatic ink developer assembly according to claim 2, wherein the hydroxyl-terminated polyester polyol comprises a hydroxyl-terminated polycaprolactone.

4. The liquid electrostatic ink developer assembly according to claim 1, wherein the polyisocyanate comprises a polymeric polyisocyanate.

5. The liquid electrostatic ink developer assembly according to claim 1, wherein the polymeric polyisocyanate is a polymeric diphenylmethane diisocyanate.

6. The liquid electrostatic ink developer assembly according to claim 1, wherein the hydroxyl-terminated polysiloxane comprises hydroxyl-terminated polydimethylsiloxane.

7. The liquid electrostatic ink developer assembly according to claim 1, wherein a surface coating precursor solution is disposed on the inner layer and cured to form the cured surface coating, the inner layer comprising, prior to deposition and curing of the surface coating precursor solution, unreacted hydroxyl groups on the surface of the inner layer to which the surface coating precursor solution can bond.

8. The liquid electrostatic ink developer assembly according to claim 1, wherein the inner layer further comprises a material selected from the group consisting of an ionic salt and carbon black particles.

9. The liquid electrostatic ink developer assembly according to claim 8 wherein the material is the ionic salt, and wherein the ionic salt is selected from the group consisting of a quaternary ammonium compound and lithium salt.

10. The liquid electrostatic ink developer assembly according to claim 1, wherein the developer roller further comprises a core surrounded by the inner layer.

11. The liquid electrostatic ink developer assembly according to claim 1 wherein the assembly further comprises an electrode, wherein the electrode and the developer roller are, in use, spaced apart to define a gap through which a liquid electrostatic ink can pass.

12. The liquid electrostatic ink developer assembly according to claim 1, wherein the assembly further comprises a squeegee roller that is located adjacent to the developer roller, wherein, in use, the squeegee roller rotates in a direction opposite from the developer roller.

13. A method of liquid electrostatic printing, the method comprising:
providing a liquid electrostatic ink composition comprising chargeable particles;
passing the ink composition between an electrode and the developer roller of claim 1;
transferring at least some of the particles from the developer roller to a photoimaging plate to form an image on the photoimaging plate; and
transferring the image from the photoimaging plate to a print medium.

14. The liquid electrostatic ink developer assembly according to claim 1, wherein the cured surface coating consists of the cured polyurethane resin.

15. A liquid electrostatic printing apparatus comprising:
a liquid electrostatic ink developer assembly comprising a developer roller including:
an inner layer including a resilient material is selected from the group consisting of natural rubber, synthetic rubber, polyurethane, and epichlorohydrin(1-chloro-2,3-epoxypropane); and
an outermost layer of a cured surface coating disposed on the inner layer, the cured surface coating comprising a cured polyurethane resin formed from a polyol; a hydroxyl-terminated polysiloxane with hydroxyl groups at both ends; and a polyisocyanate;
a photoimaging plate which, in use, rotates in an opposite direction in relation to the developer roller and is to receive a liquid electrostatic ink from the developer roller; and
an intermediate transfer member which, in use, makes contact with the photoconductive drum and with a print medium to transfer the liquid electrostatic ink onto the print medium.

16. The liquid electrostatic printing apparatus according to claim 15, wherein a surface coating precursor solution is disposed on the inner layer and cured to form the surface coating, the inner layer comprising, prior to deposition and curing of the surface coating precursor solution, unreacted hydroxyl groups on the surface of the inner layer to which the surface coating precursor solution can bond.

17. The liquid electrostatic printing apparatus according to claim 15, wherein the inner layer further comprises a material selected from the group consisting of an ionic salt and carbon black particles.

18. The liquid electrostatic printing apparatus according to claim 15, wherein the developer roller further comprises a core surrounded by the inner layer.

19. The liquid electrostatic printing apparatus according to claim 15, further comprising:
an electrode, wherein the electrode and the developer roller are, in use, spaced apart to define a gap through which a liquid electrostatic ink can pass; and
a squeegee roller that is located adjacent to the developer roller, wherein, in use, the squeegee roller rotates in a direction opposite from the developer roller.

20. A liquid electrostatic ink developer assembly comprising:
a developer roller having a cured surface coating, the cured surface coating comprising a cured polyurethane resin formed from a polyol; a hydroxyl-terminated polysiloxane; and a polyisocyanate, and forming an outermost layer of the developer roller, wherein the cured polyurethane resin is formed from about 14 wt % of the polyol; about 1 wt % of the hydroxyl-terminated polysiloxane; and about 4.4 wt % of the polyisocyanate.

21. A liquid electrostatic ink developer assembly comprising:
a developer roller including:
an inner layer including a resilient material is selected from the group consisting of natural rubber, synthetic rubber, polyurethane, and epichlorohydrin(1-chloro-2,3-epoxypropane); and
a cured surface coating disposed on the inner layer, the cured surface coating comprising a cured polyurethane resin formed from a polyol; a hydroxyl-terminated polysiloxane; and a polyisocyanate, and forming an outermost layer of the developer roller;
wherein the polyol is polycaprolactone polyol, the hydroxyl-terminated polysiloxane is polydimethylsiloxane, and the isocyanate is methylene[bis(phenyl isocyanate)].

\* \* \* \* \*